United States Patent [19]

Newman

[11] 4,288,159

[45] Sep. 8, 1981

[54] OPTICAL TEMPERATURE TRANSDUCER

[75] Inventor: David P. Newman, Yellow Springs, Ohio

[73] Assignee: The Yellow Springs Instrument Company, Inc., Yellow Springs, Ohio

[21] Appl. No.: 80,759

[22] Filed: Oct. 1, 1979

[51] Int. Cl.³ .................... G01J 5/48; G01K 11/14
[52] U.S. Cl. ................... 356/44; 73/355 R; 73/356
[58] Field of Search ............ 350/96.15, 96.29; 356/43, 44, 45; 73/355 R, 356, 362 R

[56] References Cited

U.S. PATENT DOCUMENTS

| | | | |
|---|---|---|---|
| 2,824,235 | 2/1958 | Hahn, Jr. et al. | 73/355 R |
| 3,453,434 | 7/1969 | Takami et al. | 73/355 R |
| 3,672,221 | 6/1972 | Weil | 73/339 R |
| 3,740,155 | 6/1973 | Keller et al. | 356/180 |
| 4,016,761 | 4/1977 | Rozzell et al. | 356/44 |
| 4,075,493 | 2/1978 | Wickersheim | 73/355 R |
| 4,111,050 | 9/1978 | Waddoups | 73/362 R |
| 4,136,566 | 1/1979 | Christensen | 356/44 |
| 4,140,393 | 2/1979 | Cetas | 356/43 |
| 4,201,446 | 5/1980 | Geddes et al. | 356/44 |

*Primary Examiner*—Stewart J. Levy
*Attorney, Agent, or Firm*—Biebel, French & Nauman

[57] ABSTRACT

A substantially solid temperature-dependent light absorbing mass including multiple-faceted randomly oriented and distributed reflecting chips is optically coupled on the terminal end of a fiber optical light conductor.

20 Claims, 1 Drawing Figure

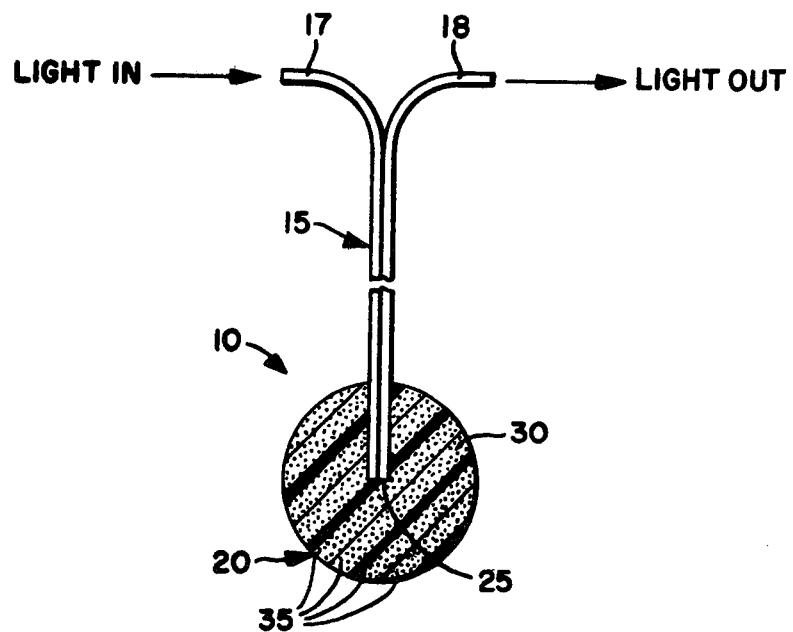

OPTICAL TEMPERATURE TRANSDUCER

BACKGROUND OF THE INVENTION

This invention relates to temperature sensors, and more particularly to a substantially solid optical temperature transducer which absorbs light as a function of its temperature. Temperature transducers of this general type are known in the prior art, and some configurations are shown in which fiber optical light guides provide for locating the transducer remotely from the detector and read-out portions of the temperature detecting system.

U.S. Pat. No. 2,824,235 (Hahn) shows using the temperature-dependent light absorbing property of a semiconductor for measuring radiant energy. U.S. Pat. No. 3,672,221 (Weil), by using the variation in the index of refraction of a semiconductor with temperature, shows how such a semiconductor may be used to measure temperature with long-wave polarized light for which the semiconductor has little absorption. Techniques such as these, however, require precision spatial orientation of the various system components.

U.S. Pat. No. 3,750,155 (Keller et al) discloses a colorimeter probe which uses fiber optics and a cone or pyramid to direct a light beam from an emitter to a light-modulating means, redirect it 180 degrees, and return it to a detector. U.S. Pat. No. 3,960,017 (Romanowski), also using fiber optics, interrupts a light beam passing from one fiber to another by using differential thermal expansions to cause a sensing rod to block the light crossing a gap in the fiber optics, as a function of temperature. This requires the emitting and detecting fibers to have their ends curved and positioned to face one another, or the use of beam directing prisms.

U.S. Pat. No. 4,016,761 (Rozzell et al) provides a structure in which the emitting and detecting fibers of the fiber optical bundle can remain parallel, by making use of the temperature dependent reflectance of liquid crystals to return the light from the emitting to the detecting fibers. U.S. Pat. No. 4,036,606 (Deficis) also uses parallel optical fibers and a liquid detector, here using the reflectance of a variable liquid meniscus to indicate temperature. U.S. Pat. No. 4,075,493 (Wickersheim) discloses a temperature probe in which a mixture of phosphors is affixed to the end of parallel fibers.

Another example of a semiconductor transducer using parallel fibers is provided by U.S. Pat. No. 4,140,393 (Cetas) in which the refractive properties of a birefringent crystal at the end of the probe are utilized by placing a polarizer and a mirror at the transducer end. Another example is in U.S. Pat. No. 4,136,566 (Christensen) in which a semiconductor transducer shaped like a prism is attached to the ends of parallel fibers to redirect light from the emitting fibers into the detecting fibers.

As will be appreciated, these prior art devices are generally fairly complicated, and require particular care in construction and assembly. Hahn and Weil need precisely aligned components to direct a beam of light to and from the thermally responsive element. Romanowski needs precisely bent and aligned fibers, or precisely aligned prisms. Rozzell, Deficis, Cetas, Christensen and Wickersheim avoid these problems by placing the thermally responsive transducer directly at the end of a fiber optic bundle. The liquid crystal transducer of Rozzell obviates the need for a particular mechanical orientation because the liquid crystal does not require such a specific orientation to the fibers. However, care in assembly of the Rozzell device is required to keep the transducer cavity optimal, an airtight chamber with optically smooth surfaces is required, and the liquid crystal transducer may suffer from instability due to exposure to wide temperature excursions.

Deficis, while being free from the need for specific transducer-to-fiber orientation, nevertheless requires a precision chamber and complete chamber isolation from the surrounding environment. There may also be some problems associated with stability of the liquid used in the transducer. Cetas gains the inherent stability of the birefringent crystal properties, but the polarizer properties may not be as predictable, and the transducer requires careful crystal preparation and crystal-to-polarizer orientation, as well as a mirror.

Christensen has avoided the problems of liquids, precision cavities, mirrors, and polarized light, through the use of a solid prism. However, the preparation of the prism itself requires precision, and the optical coupling of the prism to the fibers requires care and surface preparation. It may also present difficulties in maintaining coupling stability because of the relatively large planar coupling area where differential contraction and expansion may occur.

Wickersheim has achieved even greater ease of fabrication by simply affixing a phosphor mixture to an end of a bundle without regard to orientation, and his ratiometric technique frees this approach from concern with coupling stability. The limits on the phosphor emittance and the need for careful filtering of the two frequencies may require complications in detection and circuitry.

What is needed, therefore, is an optical temperature transducer which is compatible with parallel optical fibers, which has the same freedom from coupling problems and the same ease of assembly of the liquid crystal and phosphor transducers, and which at the same time provides the detection stability and simplicity of the solid semiconductor transducers. Such a device should also be inexpensive and readily suited for convenient, uncomplicated mass production.

SUMMARY OF THE INVENTION

Briefly, the present invention meets the above needs and purposes with an optical temperature transducer which, in the preferred embodiment, has a matrix of optically transparent material at the end of a bundle of optical fibers. Within the matrix is a number of multiple-faceted small chips from a crushed semiconductor crystal. The semiconductor is one which has the property of absorbing light as a function of temperature. The random orientation of the chips causes light which enters the matrix from one or more of the fibers to be randomly directed throughout the transducer by the chip facets. A portion of this light will pass at least through one chip and be reflected by a facet of at least one other chip to an optical fiber for detection at that fiber's other end. As the temperature of the transducer is changed, so will the absorption of the light by the chips through which the light passes. Since the change in absorption of the chips is a function of the temperature change of the transducer, it can be detected and used for determining temperature. In one variation, the chip size may be so small that the crushed semiconductor becomes like a powder.

It is therefore an object of the present invention to provide an improved optical temperature transducer and a method for the fabrication thereof; a transducer which may be secured to the end of a fiber optical light conductor; which has a substantially solid temperature-dependent light absorbing matrix mass optically coupled to the terminal end of such a fiber optical light conductor; in which the mass includes multi-faceted randomly oriented and distributed reflecting chips therein; in which the precise shape and position of the matrix mass on the end of the fiber optical light conductor is not critical; and to accomplish the above objects and purposes in an inexpensive, versatile, reliable, uncomplicated, and easily fabricated configuration suitable for the widest range of uses and applications.

Other objects and advantages of the invention will be apparent from the following description, the accompanying drawings and the appended claims.

BRIEF DESCRIPTION OF THE DRAWINGS

The drawing FIGURE shows a cross-sectional view of an optical temperature transducer according to the present invention.

DESCRIPTION OF THE PREFERRED EMBODIMENT

The drawing shows an optical temperature transducer 10 which consists of a fiber optical light guide 15 having light injecting fibers 17 and light returning fibers 18, and having a matrix mass 20 supported and optically coupled onto the terminal end 25 of the fiber optical light guide 15. The matrix mass 20 is composed of a matrix 30 (e.g., epoxy resin or glass) and multi-faceted randomly oriented and distributed reflecting chips 35 therein. Chips 35 randomly distribute the light within mass 20 which is received from the fiber optical injecting fibers 17, and by virtue of this random distribution of the light, return a portion of the light which is not otherwise absorbed through the returning fibers 18.

Somewhere within matrix mass 20, and preferably uniformly distributed therethrough, is a temperature-dependent light absorbing material, so that the matrix mass is a temperature-dependent light absorbing mass on the terminal end 25 of the fiber optical light guide 15. In the preferred embodiment, the temperature-dependent light absorbing material is a crushed semiconductor such as gallium arsenide or cadmium selenide. The crushed semiconductor is mixed in a matrix of epoxy resin which is applied, so to speak, as a "blob" on the terminal end 25 of the fiber optical light guide 15. In the preferred embodiment, the reflecting chips 35 are composed of this crushed semiconductor material, and by virtue of these reflecting chips, the precise shape of the matrix mass 20 is not critical.

The crushing of the semiconductor material can cause some of it to be minutely crushed, in the sense that it will have dimensions less than one wavelength of the light which is being absorbed. Such minutely crushed semiconductor particles are not considered "chips" within the context of the present disclosure since, while they can absorb the light in a temperature-dependent manner, they may not reflect light within mass 20. This minutely crushed semiconductor powder will thus effectively make the matrix material 30 a temperature-dependent light absorber, along with the discrete semiconductor chips 35.

Alternatively, the semiconductor material 35 may be composed solely of the larger chips 35, and no powder. In that case, the chips will be the temperature-dependent light absorbers and the matrix 30 will be substantially unaffected by temperature. Still another alternative, within the scope of the present invention, is to provide chips, for example of glass, which are substantially unaffected by temperature, and to use a matrix, such as a mixture of epoxy resin and minutely crushed semiconductor powder, which is a temperature dependent light absorber. Or, the mass 20 could be composed of suitable chips 35 and a matrix 30 composed of a mixture of a hardenable carrier, such as an epoxy resin, and another suitable temperature-dependent light absorbing material such as micro-encapsulated temperature-dependent light absorbing liquids. Suitable hybrid combinations of these variations are also within the scope of the present invention.

In certain applications it may be useful to shield the transducer from ambient light. This can easily be done by coating the exterior of the transducer with an opaque paint such as a spray-on aluminum paint, or other suitable coating according to the application at hand. A nice, optically opaque and very thin coating can be obtained using an epoxy paint such as "EPO-TEK 320", manufactured by Epoxy Technology, Inc., Billerica, Mass.

As may be seen, therefore, the present invention has numerous advantages. The reflecting/transmitting configuration of a parallel-fiber semiconductor probe tip may be combined with, yet be practically independent of, the temperature-dependent light modulating function. The reflecting/transmitting and absorbing functions of the crushed gallium arsenide transducer, in the preferred embodiment, are not inter-relatedly dependent upon precision fabrication techniques. It is thus far less expensive to manufacture and assemble than the prior art devices discussed above. The assembly and arrangement of the components are non-critical, allowing for considerable variations in geometry and composition according to the particular needs at hand. Similarly, the transducer 10 can be used compatibly with many types of detection equipment, such as shown for example, in some of the above-noted prior art references (for instance, Rozzell, Romanowski, and Christensen).

While the process and product herein described constitute preferred embodiments of the invention, it is to be understood that the invention is not limited precisely thereto, and that changes may be made therein without departing from the scope of the invention.

What is claimed is:
1. An optical temperature transducer, comprising:
   (a) fiber optical light conducting means having a terminal end,
   (b) a substantially solid temperature-dependent light absorbing matrix mass optically coupled on said terminal end of said fiber optical light conducting means, and
   (c) said matrix mass including multifaceted randomly oriented and distributed reflecting chips therein for randomly distributiung light therein received from said fiber optical light conducting means and returning a portion of the unabsorbed light therethrough, reflection of light by said chips being substantially unaffected by temperature.
2. The transducer of claim 1 wherein said matrix mass comprises a substantially solid transparent material containing minutely crushed temperature-dependent light absorbing material.

3. The transducer of claim 2 wherein said transparent material is an epoxy resin.

4. The transducer of claim 1 wherein the light absorbing component of said temperature-dependent light absorbing matrix mass includes a crushed temperature-dependent light absorbing semiconductor material.

5. The transducer of claim 1 wherein the light absorbing component of said temperature-dependent light absorber includes micro-encapsulated temperature-dependent light absorbing liquids.

6. The transducer of claim 1 further comprising an optically opaque coating on the exterior thereof.

7. An optical temperature transducer, comprising:
 (a) a bundle of optical fibers having a terminal end,
 (b) a substantially solid temperature-dependent light absorbing matrix mass optically coupled on said terminal end of said fiber optical bundle,
 (c) said matrix being a transparent epoxy resin,
 (d) said matrix mass including multifaceted randomly oriented and distributed, crushed, temperature-dependent, light absorbing, reflecting semiconductor chips for randomly distributing light therein received from said fiber optical bundle and returning a portion of the unabsorbed light therethrough, and
 (e) an optically opaque coating on the exterior of said matrix mass.

8. A method for fabricating an optical temperature transducer, comprising:
 (a) mixing a temperature-dependent light absorbing material, multifaceted reflecting chips, and a hardenable carrier, and
 (b) hardening a mass thereof on the terminal end of a fiber optical light conducting means.

9. The method of claim 8 wherein said mixing step further comprises crushing a temperature-dependent light absorbing material and mixing it with the carrier.

10. The method of claim 8 further comprising applying an optically opaque coating to the exterior of the mass.

11. A method for fabricating an optical temperature transducer, comprising:
 (a) crushing a temperature-dependent light absorbing semiconductor material,
 (b) mixing the crushed material with an epoxy resin carrier,
 (c) hardening a mass thereof on the terminal end of a bundle of optical fibers, and
 (d) applying an optically opaque coating to the exterior of the mass.

12. An optical temperature transducer, comprising:
 (a) fiber optical light conducting means having a terminal end,
 (b) a substantially solid matrix mass optically coupled on said terminal end of said fiber optical light conducting means, and including multifaceted randomly oriented and distributed reflecting chips therein for randomly distributing light therein received from said fiber optical light conducting means and returning a portion of the unabsorbed light therethrough, said chips providing temperature dependent absorption of light.

13. The transducer of claim 12 wherein said chips are formed of a crushed, temperature-dependent light absorbing semiconductor material.

14. The transducer of claim 12 further comprising an optically opaque coating on the exterior thereof.

15. An optical temperature transducer, comprising:
 (a) fiber optical light conducting means having a terminal end,
 (b) a substantially solid temperature-dependent light absorbing matrix mass optically coupled on said terminal end of said fiber optical light conducting means, and
 (c) said matrix mass including multifaceted randomly oriented and distributed reflecting chips therein for randomly distributing light therein received from said fiber optical light conducting means and returning a portion of the unabsorbed light therethrough, said chips providing temperature dependent absorption of light.

16. The transducer of claim 15 wherein said matrix mass comprises a substantially solid transparent material containing minutely crushed temperature-dependent light absorbing material.

17. The transducer of claim 16 wherein said transparent material is an epoxy resin.

18. The transducer of claim 15 wherein the light absorbing component of said temperature-dependent light absorbing matrix mass includes a crushed temperature-dependent light absorbing semiconductor material.

19. The transducer of claim 15 wherein the light absorbing component of said temperature-dependent light absorbing matrix mass includes micro-encapsulated temperature-dependent light absorbing liquids.

20. The transducer of claim 15 further comprising an optically opaque coating on the exterior thereof.

* * * * *